United States Patent [19]

Harrison

[11] 4,211,113
[45] Jul. 8, 1980

[54] TEMPERATURE MEASUREMENT

[75] Inventor: Peter G. Harrison, Redbourne, England

[73] Assignee: Hawker Siddeley Dynamics Engineering, Ltd., Hatfield, England

[21] Appl. No.: 24,718

[22] Filed: Mar. 28, 1979

[30] Foreign Application Priority Data

Apr. 5, 1978 [GB] United Kingdom ............... 13260/78

[51] Int. Cl.² ............................................. G01K 7/02
[52] U.S. Cl. ................................... 73/359 R; 364/557
[58] Field of Search ................ 73/359 R, 359 A, 341, 73/342, 362 R, 362 CP, 362 AR, 362 SC, 1 F; 364/557

[56] References Cited

U.S. PATENT DOCUMENTS 3,459,925 8/1969 Goosey et al. ......................... 73/341
4,126,826 11/1978 Dobkin ............................. 73/362 SC Primary Examiner—Donald O. Woodiel
Attorney, Agent, or Firm—Howard L. Rose

[57] ABSTRACT

In a temperature measurement region, a thermocouple and a reference voltage source in turn supply voltages via solid state switches to the center-tapped primary winding of a transformer. The output voltages of the transformer secondary winding are applied via an analogue-to-digital converter to a crystal-clock-regulated digital processing unit that obtains the difference of positive and negative voltages derived from the thermocouple signal, the positive and negative voltages derived from the reference voltage, for subsequent ratiometric processing. The switches are operated by a switch control unit that responds to signals arriving via electrically-isolating transducers from switch control latches that receive switch control outputs from the digital processing unit.

6 Claims, 1 Drawing Figure

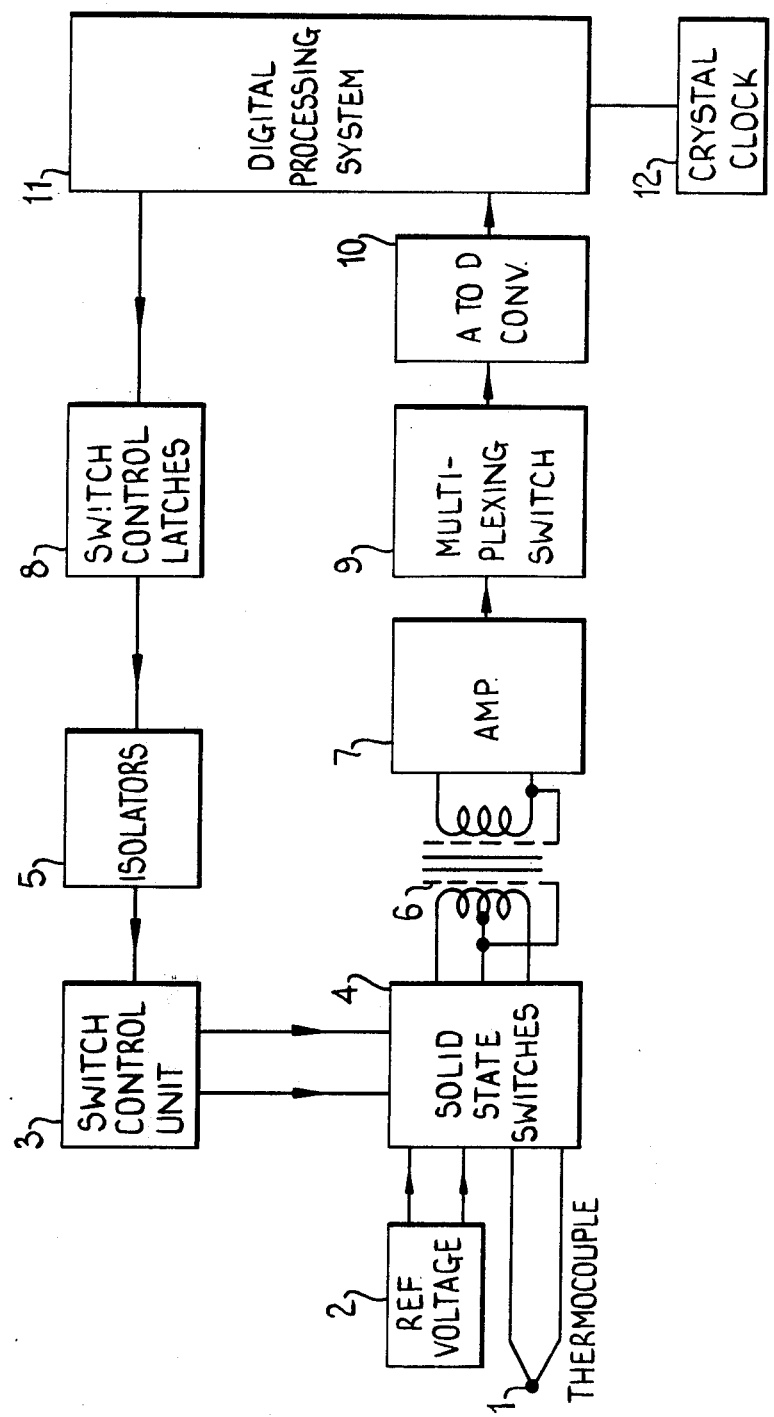

TEMPERATURE MEASUREMENT

This invention is concerned with temperature measuring methods and apparatus when the sensing element, typically a thermocouple, is electrically isolated from the measurement or indicating means.

Such a situation frequently arises when the sensing element is incorporated as part of an operating mechanical or electro-mechanical system and is electrically linked to said mechanical system, whereas the measurement or indicating means is electrically linked to another electro-mechanical or electrical system. Under these circumstances there frequently exists a difference of electrical potential between the sensing element and the measurement or indicating means and, if no other precautions were taken, the resulting current flow would degrade the accuracy of measurement or the indication of the output of the sensing element.

The degradation of accuracy can be avoided by preventing spurious current flow in the connections between sensing elements and measurement or indicating means. Providing electrical isolation to prevent or limit said current flow is possible in a number of ways well known to those versed in the art. However, the prior art techniques are prone to errors and it is an object of this invention to reduce or eliminate errors due to such techniques.

According to the present invention, a temperature measuring system comprises a temperature sensing element delivering a signal voltage representative of temperature, a reference voltage source, a transformer, switches controlling the application of said signal voltage and the reference voltage to a primary winding of the transformer, a digital processing unit, an analogue-to-digital converter converting signal voltages appearing on a secondary winding of the transformer to digital signals and applying them to said digital processing unit, and a switch control channel whereby said switches are controlled by periodic outputs from the digital processing unit, said control channel including transducers that electrically isolate the switches from the digital processing unit.

Employing a reference signal which is passed across the isolating barrier in exactly the same way as is the temperature sensing element signal enables the ratio of reference to signal to be established with a self-calibration characteristic.

One arrangement in accordance with the invention will now be described by way of example, with reference to the accompanying drawing which is a block diagram of a temperature measurement system.

Referring to the drawing, a signal voltage generated by a thermocouple 1, and a reference voltage 2 which is of a similar magnitude to the thermocouple signal voltage, are both applied by solid state switches 4 to a primary of a transformer 6. The control of the solid state switches is by a digital processing system 11, which delivers control data to be stored in latches 8. This data is passed across optical isolators 5 to a switch control unit 3, where said data is processed to a form suitable for control of solid state switches 4. The optical isolators 5 may be electrical-optico-electrical transducers.

Transformer 6 has a centre-tapped primary winding and the thermocouple signal and reference voltages are applied in turn to either end of this primary winding with the centre tap acting as a common return for both reference and signal voltages. Application of the voltages in the above manner prevents magnetic saturation of transformer 6, and avoids degradation of the incoming switched voltages due to magnetising currents flowing through the 'on' resistance of switches 4. Each voltage generated in the secondary winding of transformer 6 as a result of said switching is increased by amplifier 7 to a magnitude suitable for application via multiplexing switch 9 to analogue-to-digital converter 10.

The analogue-to-digital converter 10 is controlled by the digital processing system 11, which has a precise crystal clock 12 as time reference, and the converter is caused to convert an incoming amplified voltage a short time delay after there has been an output of control data to the switch control latches 8. This delay is selected to make allowance for propagation delays across the optical isolators 5, switching delays, and the rise time of the amplified voltage due to the finite bandwidth of both transformer and amplifier. Once the thermocouple signal or reference voltage has been acquired by said analogue-to-digital converter, further ouput of control data from the digital processing system 11 to control latches 8 will cause solid state switches 4 to revert to their open state, thus removing the applied signal from the converter. Since the digital processing system 11 has a precise time reference, the intervals for the application of the two signals to the two ends of the primary winding can all be made identical in time. This identical timing avoids errors which might be due to bandwidth limitation in both transformer and amplifier.

Each of the thermocouple and reference voltages is applied to either end of the centre-tapped primary of transformer 6, resulting in both positive and negative voltages appearing on analogue-to-digital converter 10. By using the arithmetic capability of the digital processing system 11 to provide the differences between said positive and negative voltages, one pair of voltages being derived from the thermocouple voltage and a second pair being derived from the reference voltage, any offset errors due to amplifier 7, multiplexing switch 9 or analogue-to-digital converter 10 will be eliminated.

Ratiometric processing of the measured thermocouple and reference voltages thus obtained enables the gain of the system to be compensated to the point when the overall accuracy of measurement is principally determined by the accuracy of reference voltage 2.

To maintain electrical isolation between the thermocouple and the digital processing system 11, all power supplies to the switch control 3, switches 4 and reference voltage source 2 must be electrically isolated from the power supplies to said digital processing system 11.

claim:

1. A temperature measuring system comprising a temperature sensing element delivering a signal voltage representative of temperature, a reference voltage source, a transformer, switches controlling the application of said signal voltage and the reference voltage to a primary winding of the transformer, a digital processing unit, an analogue-to- digital converter converting signal voltages appearing on a secondary winding of the transformer to digital signals and applying them to said digital processing unit, and a switch control channel whereby said switches are controlled by periodic outputs from the digital processing unit, said control channel including transducers that electrically isolate the switches from the digital processing unit.

2. A system according to claim 1, wherein the switches are solid state switches and said switch-control channel includes switch control latches receiving the switch control outputs of the digital processing unit, and a switch control unit for operating the switches, and said isolating transducers are located in the switch control channel between said switch control latches and said switch control unit.

3. A system according to claim 1 or claim 2, wherein the analogue-to-digital converter is controlled by the digital processing unit which itself is time-regulated by a crystal clock, each conversion operation of the converter being arranged to commence a short time delay after switch control outputs have been generated by the digital processing unit.

4. A system according to claim 1 or claim 2 or claim 3, wherein the transformer has a centre-tapped primary winding, and the temperature signal voltage and reference voltage are switched so that each is applied in turn to either end of said primary winding, whereby both positive and negative voltages in respect of each appear on the input of the converter.

5. A system according to claim 4, wherein the digital processing unit is arranged to determine the difference of said positive and negative voltages derived from said temperature signal voltage, and the difference of said positive and negative voltages derived from said reference voltage, for subsequent ratiometric processing.

6. A system according to any one of the preceding claims, wherein the electrical power supplies to the switch control unit, switches and reference voltage source are electrically isolated from the power supplies to the digital processing unit.

* * * * *